(12) United States Patent
Fujisawa et al.

(10) Patent No.: US 6,653,410 B1
(45) Date of Patent: Nov. 25, 2003

(54) METHOD FOR TREATING RESIN COMPOSITION

(75) Inventors: Takeshi Fujisawa, Kanagawa (JP); Yoshiyuki Arai, Kanagawa (JP); Hiroshi Mikami, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/018,960

(22) PCT Filed: Apr. 27, 2000

(86) PCT No.: PCT/JP00/02795

§ 371 (c)(1), (2), (4) Date: Dec. 27, 2001

(87) PCT Pub. No.: WO01/83601

PCT Pub. Date: Nov. 8, 2001

(30) Foreign Application Priority Data

Nov. 4, 1998 (JP) .......................................... 10-313592
May 24, 1999 (JP) .......................................... 11-142807
Feb. 7, 2000 (JP) ......................................... 2000-28737

(51) Int. Cl.[7] ................................................ C08F 8/00
(52) U.S. Cl. ................. 525/366; 525/327.8; 525/329.1; 525/329.2; 525/329.4; 525/330.6; 525/337.5; 525/333.3; 525/333.7
(58) Field of Search ................................. 525/366, 369

(56) References Cited

FOREIGN PATENT DOCUMENTS

| DE | 207 629 | | 3/1984 |
|---|---|---|---|
| DE | 4221408 | * | 1/1994 |
| EP | 0 249 748 B1 | | 12/1987 |
| EP | 0 510 800 A1 | | 10/1992 |
| JP | 6-144801 | | 5/1994 |
| JP | 11-293259 | | 10/1999 |
| JP | 2000-117736 | | 4/2000 |
| JP | 2000-117737 | | 4/2000 |
| JP | 2000-198874 | | 7/2000 |

* cited by examiner

Primary Examiner—Bernard Lipman
(74) Attorney, Agent, or Firm—Birch, Stewart, Kolasch & Birch, LLP

(57) ABSTRACT

Disclosed is a treating method of a resin composition comprising: kneading a resin composition comprising a thermoplastic resin, 0 to 0.7 part by weight, based on 1 part by weight of the thermoplastic resin, of a treating agent having a capacity of hydrogenating a halogen and a halide, at 280 to 450° C., in the presence of a metal compound which combines with a halogen atom to generate a metal halide compound having a boiling point or sublimation point not greater than 450° C. at atmospheric pressure, to thereby convert the halide into a metal halide; and separating and collecting, from the resin composition, each of a mixture of the thermoplastic resin and the treating agent having a capacity of hydrogenating a halogen, and the metal halide. This makes it possible to treat a waste without conducting gasification or liquefaction of a resin by combustion or thermal decomposition, thereby removing and collecting the halogen such as bromine and the metal oxide therefrom in a high yield in a short time. The resin thus treated can be collected as a solid fuel in a high yield and can be provided for recycling use.

7 Claims, 2 Drawing Sheets

METHOD FOR TREATING RESIN COMPOSITION

This application is the national phase under 35 U.S.C. § 371 of PCT International Application No. PCT/JP00/02795 which has an International filing date of Apr. 27, 2000, which designated the United States of America.

TECHNICAL FIELD

The present invention relates to a method of treating a resin composition comprising a thermoplastic resin and a halogen flame retardant at 450° C. or less to convert the halogen contained in the halogen flame retardant into a metal halide, and then separating and collecting each of the thermoplastic resin and the metal halide from the resin composition.

BACKGROUND ART

Resin materials used for housing materials of household electric appliances or building materials are imparted with flame retardancy. Particularly, materials used for a chassis of a television tend to have a bromine compound kneaded therein in order to satisfy UL standards and the bromine content in each of such chassis materials amounts to 12 to 15 wt. %. In addition, a metal compound, as a flame retarding assistant, is kneaded in the resin materials to heighten the effect of their flame retardancy. By heating, the metal compound combines with the halogen, thereby forming a metal halide, which, upon evaporation, has an effect of blocking contact between oxygen and the resin. When disposal of resin materials is conducted by incineration, therefore, there is a possibility that they generate a metal halide.

Conventionally, the following investigations have been made with respect to the technique for collecting, from a halogen-containing resin, the halogen and metal.

JP-A-11-293259 (The term "JP-A" as used herein means an "unexamined published Japanese patent application") discloses a method of removing from a halogen-containing thermoplastic resin the halogen. In this method, the halogen is converted into its metal salt by using an alkaline earth metal. This metal salt however remains in a reaction residue and cannot be collected easily. In addition, this method is accompanied with such a problem that the resin thermally decomposed and liquefied by using a phosphorus or nitrogen type catalyst is collected, but the liquefaction ratio is however about 50% and the proportion that can be recycled as a source is low.

JP-A-10-328641 discloses dechlorination of poly(vinyl chloride) (a resin including a chlorine-containing resin) by using a thermoplastic resin (PP was exemplified in the Examples). There is not disclosed therein a method of separating and collecting from a resin composition a halogen in the form of a metal halide.

JP-10-237214 discloses a method comprising heating waste plastics having chlorine-containing plastics mixed therein to react the resulting hydrogen chloride with a metal, and collecting the metal chloride in the gaseous form. This method features that the metal chloride serving as a thermal decomposition catalyst of the resin gasifies or oilfies the resin, but its description does not include decomposition efficiency and the like.

JP-A-6-144801 discloses a method which comprises heating a thermosetting epoxy resin containing bromine and antimony, which resin serves as an LSI sealant, to generate a gas, and hydrolyzing this gas with an alkali, thereby collecting bromine and antimony. However, there is not disclosed therein a thermoplastic resin.

JP-A-6-136458 discloses a technique of reducing zinc oxide into zinc and then reacting the zinc with vinyl chloride as a chlorine source to form zinc chloride, thereby lowering its boiling point. This method is for collecting of zinc oxide in a blast furnace.

As described above, various halogen treating methods have been studied. However, there is still a demand for developing a method of separating and collecting, from a resin composition comprising a thermoplastic resin and a halide, the halogen at low temperatures not greater than 450° C. and permitting a high reusing ratio of the thermoplastic resin thus separated.

An object of the present invention is therefore to provide a method of treating the waste without gasification or liquefaction of a resin by combustion or thermal decomposition, thereby separating and collecting a halogen such as bromine and a metal oxide therefrom in a short time and high yield and making it possible to collect and reuse the thus-treated resin as a solid fuel in a high yield.

DISCLOSURE OF THE INVENTION

The present inventors found a metal or metal compound which reacts with a halide such as bromine, thereby generating a metal halide having a boiling point or sublimation point of 450° C. or less at atmospheric pressure, leading to the completion of the present invention.

Accordingly, the present invention relates to:

(1) A treating method of a resin composition comprising:
   kneading a resin composition comprising a thermoplastic resin, 0 to 0.7 part by weight, based on 1 part by weight of the thermoplastic resin, of a treating agent having a capacity of hydrogenating a halogen and a halide, at 280 to 450° C., in the presence of a metal compound which combines with a halogen atom to generate a metal halide compound having a boiling point or sublimation point not greater than 450° C. at atmospheric pressure, to thereby convert the halide into a metal halide; and
   separating and collecting, from the resin composition, each of a mixture of the thermoplastic resin and the treating agent having a capacity of hydrogenating a halogen, and the metal halide;

(2) The method according to (1) above, wherein the treating agent having a capacity of hydrogenating a halogen is an organic compound or polymer having a carbon/hydrogen element number ratio of 0.25 to 1.0;

(3) The method according to (1) or (2) above, wherein the treating agent having a capacity of hydrogenating a halogen is a polyolefin;

(4) The method according to any one of (1) to (3), wherein reaction and deaeration are conducted by using an apparatus having a rotary stirring function under the conditions of an effective processing surface area of 5 m² to 1000 m² and pressure reducing degree of 13.3 kPa or less;

(5) The method according to (4), wherein a specific energy applied to the resin composition until the temperature of the resin composition reaches 300° C. is 10 MJ/m³ to 300 MJ/m³;

(6) The method according to any one of (1) to (5), further comprising a step of treating the thus-separated and collected metal halide with an aqueous alkali solution, to thereby convert the metal of the metal halide into a metal oxide;

(7) A metal oxide obtained by a method according to (6) above;

(8) A mixture obtained by separating and collecting according to a method of any one of (1) to (6), comprising the thermoplastic resin and the treating agent having a capacity of hydrogenating a halogen.

Figure 1:
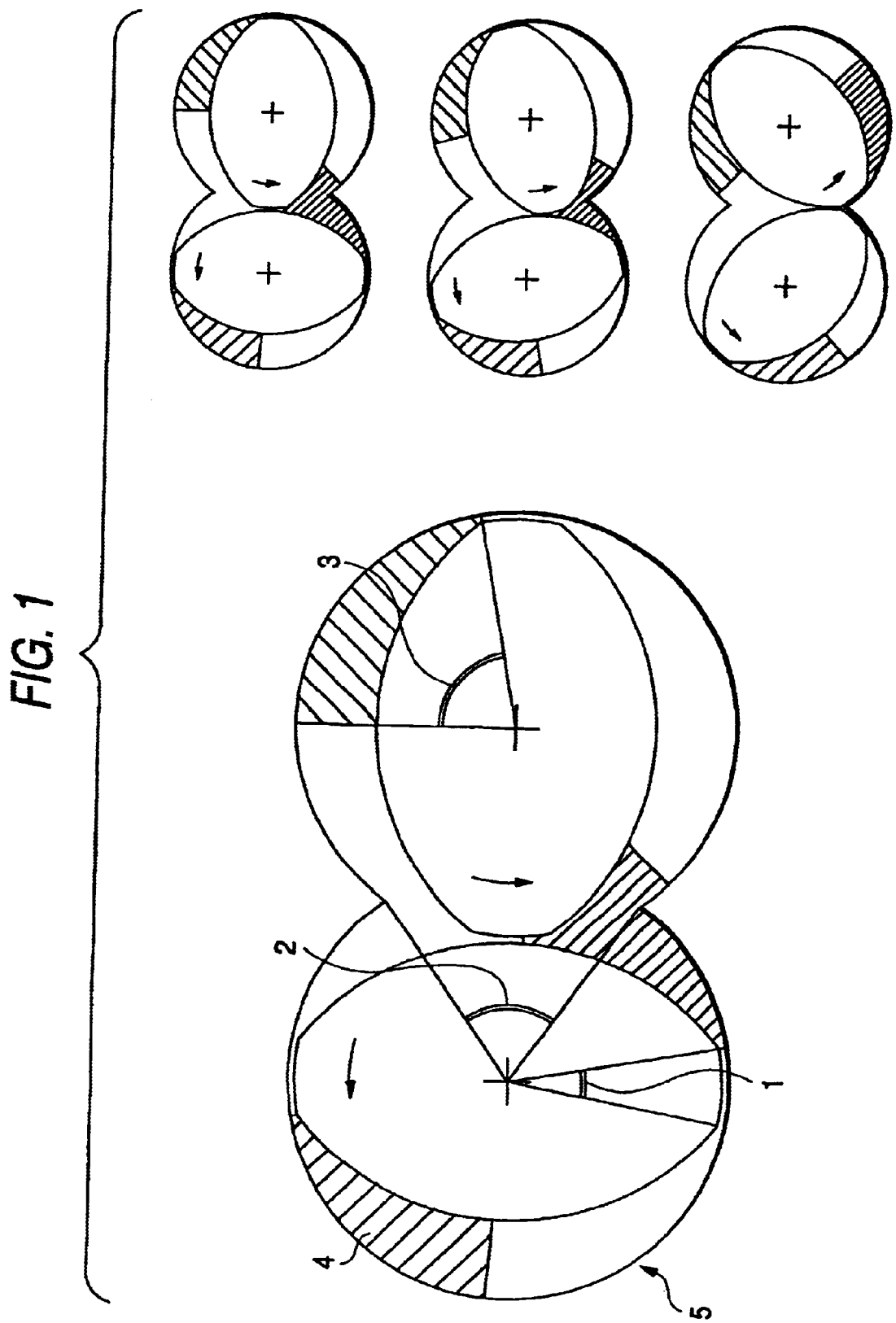
FIG. 1 is a cross-sectional view illustrating a kneader.

1: apical angle (α) of screw element, 2: side opening angle (β), 3: angle related to resin reservoir (θ), 4: resin reservoir, 5: barrel surface of kneader related to deaeration, 6: feeder for charging a resin to be treated in a preheating and kneading extruder, 7: preheating and kneading extruder, 8: orifice tube, 9: deaeration line, 10: kneader, 11: vacuum pump, 12: withdrawal gear pump, 13: withdrawal port, 14: cleaning tower (gas absorption tower), 15: inlet for aqueous alkali solution, 16: sprayer of aqueous alkali solution, 17: exhaust line, 18: filtering apparatus, 19: withdrawal port for filtrate, and 20: outlet for filtrate.

BEST MODE FOR CARRYING OUT THE INVENTION

Although no particular limitation is imposed on the thermoplastic resin in the invention insofar as it can be plasticized by heating, examples thereof include poly(vinyl chloride), poly(vinylidene chloride), styrene resins, modified PPE resins (such as "NORYL", trade name; product of GE plastics and "XYRON", trade name; product of Asahi Kasei Corporation), poly(methyl methacrylate) (PMMA), poly(vinyl acetate) (PVA), polyacetal (POM), polybutylene oxide (PBT), polyamide resins (PA) a polyacrylonitrile. The term "styrene resin" as used herein means a polymer having a styrene monomer unit in an amount of 50 wt. % or greater. Examples thereof include general purpose polystyrene (GPPS), syndiotactic polystyrene, high impact polystyrene (HIPS), styrene acrylonitrile butadiene graft copolymer (ABS), styrene acrylonitrile copolymer (SAN), styrene methyl methacrylate copolymer (MS), styrene methacrylic acid copolymer (SMAA), styrene maleic anhydride copolymer (SMAH) and styrene butyl methacrylate copolymer.

The term "halide" in the invention means a compound to be added to impart a resin composition with flame retardancy. Although no particular limitation is imposed thereon, examples thereof include brominated polyethylene, chlorinated polystyrene and brominated polystyrene. When a styrene resin is employed as the thermoplastic resin, usable as the halide are decabromodiphenyl ether, tetrabisphenol A or an oligomer thereof, polybrominated modified epoxy compounds, hexabromobenzene, brominated polyethylene, decabromobiphenyl, 1,2,3,4,5-pentabromotoluene, 1,2,3,4, 5-pentabromoethylbenzene, bis(1,3,5-tribromophenoxy) ethylene, 1,2,3,4,5-pentabromophenol, 1,3,5-tribromophenol, polybrominated styrene monomers and oligomers, and polybrominated cycloalkanes.

In the invention, the halide is preferably used in an amount of about 18 to 21% based on the weight of the thermoplastic resin composition and a preferable bromine content of this thermoplastic resin composition is 15 to 20 wt %.

The expression "metal compound which combines with a halogen atom and generates a metal halide compound having a boiling point or sublimation point not greater than 450° C. at atmospheric pressure" used in the invention means, for example, zirconium oxide (zirconia), zinc oxide (chinese white), stannous oxide, stannic oxide, tetraphenylstibine, bismuth oxide (sillenite), diantimony trioxide (stibnite), cerium oxide (ceria), titanium oxide (titania) and oxoantimony (III) chloride.

These metal compounds promptly react with a halide in the presence of a resin component and evaporate in the gaseous form.

The term "kneading" in the invention means continuous kneading of the resin composition in an apparatus equipped with a stirrer. Continuous kneading in an extruder or kneader is preferred.

The term "metal halide" in the invention means a metal halide formed from the above-described metal compound and examples thereof include $ZrX_4$, $ZnX_2$, $SnX_2$, $SnX_4$, $SbX_3$, $SbX_5$, $BiX_3$, $CeX_3$ and $TiX_4$. Here, X means a halogen atom.

The expression "separating and collecting, from the resin composition, each of a mixture of the thermoplastic resin and the treating agent having a capacity of hydrogenating a halogen, and the metal halide" in the invention means collecting, in the gaseous form, the metal halide formed by reaction, thereby separating the halogen from the resin components.

The treating agent having a capacity of hydrogenating a halogen used in the invention is preferably an organic compound or a polymer.

The term "organic compound" in the invention means a compound composed mainly of carbon and hydrogen atoms. Although no particular limitation is imposed thereon, those having a high boiling point such as alkane hydrocarbons including a mineral oil and heavy oil are preferred.

The term "polymer" in the invention mainly means a thermoplastic resin.

The treating agent having a capacity of hydrogenating a halogen is, more specifically, a compound having, in the molecule thereof, a secondary or tertiary hydrogen or a mixture of such a compound. Specific examples thereof include PP wax, PE wax, beeswax, paraffin wax, 9,10-hydroanthracene, mineral oil, tetralin, petroleum resins and polyolefin resins. Polyolefin resins usable here include low density polyethylene, high density polyethylene, polyethylene/polypropylene copolymer and polypropylene, with tertiary-hydrogen-containing polypropylene having a high hydrogenating capacity being particularly preferred. A large amount of polypropylene is contained in the laundry sink of a clothes washer or automobile parts so that polypropylene obtained from the waste of them is also usable as the treating agent.

The term "carbon/hydrogen element number ratio" in the invention means a ratio of carbon atoms to hydrogen atoms constituting a compound used as a hydrogenating agent. For example, polypropylene or polyethylene has n/(2n+2) as this ratio, wherein n means the number of carbon atoms.

The term "apparatus having a rotary stirring function" in the invention means an apparatus wherein a molten substance is kneaded and the surface of the substance is always replaced with a new one in order to collect the halogen and metal halide in the gaseous form. Examples thereof include extruder, kneader, reactor equipped with a rotar blade and continuous deaerator having a filling. An effective processing surface area is defined as below as an index of this deaeration efficiency.

The term "effective processing surface area" as used herein means a replacement degree of the surface for removing a volatile bromine compound and antimony compound by volatilization, and is defined as shown below. Hereunder, a method of deriving the effective surface area is described referring to the case where a kneader is employed as an apparatus equipped with a rotary stirring function.

FIG. 1 is a cross-sectional view of the barrel of a kneader taken perpendicularly relative to the screw direction. When the screw turns, the resin composition charged in the barrel is stretched by the rotation of the resin reservoir 4 and forms a thin film 5 on the inner surface of the barrel. From this thin resin film, hydrogen bromide and antimony compound evaporate out. The surface area $dS_f$ of the film per length $dL$ of the element which is a constitution unit of this screw is expressed by the following equation:

$$dS_f = (1/2) \cdot D \cdot [(4\pi - 2\beta) - i \, (\theta + \alpha)] dL$$

wherein, D means an internal diameter of a cylinder, $\pi$ stands for a ratio of the circumference of a circle to its diameter, $\beta$ means side opening angle (frank angle), $\alpha$ means an apical angle of a screw element and i means the number per cross-section of the resin reservoir. Removal of volatile components from the resin components depends on how much film surface area can be gained. This index is defined as a processing surface area of the kneader. Accordingly, the processing surface area of the kneader is represented by the following $S_f$:

$$S_f = \int dS_f = (1/2) \cdot D \int [(4\pi - 2\beta) - i \, (\theta + \alpha)] dL$$

with the proviso that the integral range is from $L=_0$ to $L=L_0$, wherein $L_0$ means the barrel length of the kneader. The above-described equation can be simplified when the screw element has a desk type structure, because in this case, the angle $\theta$ related to the resin reservoir depends little on L.

From the processing surface area $S_f$ thus determined, an effective processing surface area $S_e$ upon treatment is derived. This effective processing surface area indicates how much area becomes effective for deaeration when the resin is treated in a kneader, and it is defined as follows:

$$S_e = S_f \tau / t_f$$

wherein $\tau$ stands for retention time in a kneader, $t_f$ means time until the surface for treatment in the kneader is replaced with a new one and $1/t_f$ means the number of replacement times of the treated surface in the kneader. The value $t_f$ is derived in accordance with the following equation:

$$t_f = (1/2) \cdot (D/v)[(4\pi - 2\beta)/i - (\theta + \alpha)]$$

wherein v means a speed of a screw inside of the barrel, more specifically, (inner diameter of the barrel) x (the number of rotational frequency of the screw).

Description was so far made referring to an example using a kneader, but the apparatus having rotary stirring function is not limited to a kneader insofar as it is a reactor permitting continuous replacement of the surface as in the above-described definition. For example, a reactor filled with a filling may be used. When it is used, the effective processing surface area:

$$Se = a \cdot N \cdot F$$

wherein symbol a means a surface area per filling, N stands for the number of fillings existing in the reactor, and F means a surface replacement coefficient.

The term "specific energy" as used herein is an index showing how much energy a mixture of the treating agent and the resin receives per unit area by shearing upon mixing them and it means a kneading index of the resin and the hydrogenating agent. The higher this value, the better they are kneaded. This definition can be expressed by the following equation:

$$e_v = \eta \cdot (d\gamma/dt) \cdot \tau$$

wherein $(d\gamma/dt)$ means an average shear rate, $\eta$ means the viscosity of the resin compound and $\tau$ means a retention time. As shown by this equation, the lower the viscosity, the smaller the specific energy. At a small specific gravity, kneading of the resin and the treating agent is insufficient.

The expression "treating the thus-separated and collected compound with an aqueous alkali solution" as used herein means carrying out neutralization and hydrolysis of a collected gas with an aqueous alkali solution having a pH of 7 or greater. Examples of the aqueous alkali solution include solution of sodium hydroxide, solution of potassium hydroxide, suspension of calcium hydroxide, aqueous solution of sodium bicarbonate, aqueous solution of sodium carbonate and aqueous ammonia solution.

The halogen-containing thermoplastic resin or thermoplastic resin composition containing a halide reacts with a metal compound at 280° C. or greater, thereby forming a metal halide. The formed metal halide evaporates. In the conventionally known decomposition mechanism of a halide (flame retardant), a hydrogen halide is generated from a halide and a resin, and it then reacts with the metal compound to generate a metal halide. Under the temperature conditions of the invention, such a reaction mechanism does not apply to the progress of the reaction of the present invention. A description will next be made of a reaction system of HIPS/decabromodiphenyl ether/diantimony trioxide investigated by the present inventors.

First, whether or not the reaction of a halide with a resin emits hydrogen bromide was examined. In order to confirm it, employed was a method of charging about 1 g of a resin composition containing decabromodiphenyl ether/HIPS at a mixing ratio of 20/80 parts by weight in a quartz tube and then causing a gas generated in each of a system wherein nitrogen and air were circulated at 100 ml/min and an evacuated system to absorb in an aqueous alkali solution. In the evacuated system, the exhaust gas was trapped using liquid nitrogen and after treatment with an aqueous alkali solution, the bromine concentration of the treated solution was measured using an ion meter. For improvement of precision, the concentration of the remaining bromine was measured by the combustion flask method after collection of oily components and resin residue remaining inside of the quartz tube. At 380° C. or greater, generation of oily components due to thermal decomposition of the resin components was recognized, but no hydrogen bromide was emitted. Temperature dependence of a weight loss ratio at a temperature range of from 300 to 450° C. was observed by thermogravimetric analysis (TGA). It showed almost similar behavior to the weight loss ratio of HIPS. From the above-described results, it was confirmed that the reaction system of the invention differs with that of the conventional reaction system in the generation of antimony tribromide. In order to clarify how antimony tribromide is formed, the following investigation was made.

A resin composition of diantimony trioxide/HIPS in a mixing ratio of 80/5 parts by weight was subjected to thermogravimetric analysis (TGA) under the conditions of a nitrogen gas stream at 20 ml/min. In this reaction system, a weight loss of the sample started at 280° C. or higher. The reaction proceeded rapidly and the weight loss was about 10 wt. %/min at 300° C., reaching 100 wt. %/min at 350° C. As a result of metal analysis of the residue of the sample after reaction, at least 99% of antimony contained in the mixture evaporated, from which it is presumed that diantimony trioxide reacted with the resin component to form a volatile stibine compound and water. Diantimony trioxide converts into a stibine compound, which reacts with the halide into antimony tribromide. To confirm this fact further, triphenylstibine (product of Aldrich) capable of existing stably as a stibine compound and decabromodiphenyl ether were mixed and charged in a forked test tube (this test tube has a structure permitting heating to 300° C. in one branch of the test tube and cooling with liquid nitrogen in the other branch to acquire gas components; and permitting falling of the sample at the inlet of the test tube into the heating tube) which had been evacuated, a reddish transparent fuming liquid was collected. Analysis of this substance revealed that the compound contained Br at a ratio of 2.5 to 3.0 relative to 1 of Sb, thus showing the generation of antimony tribromide. A similar fuming liquid was obtained either in a nitrogen gas stream or in an air stream. When a resin composition of HIPS and diantimony trioxide is refluxed under heating, antimony is reduced into metal antimony, suggesting that this reactivity greatly depends on the reaction temperature of the metal compound with a hydrocarbon resin.

In the present invention, as described above, a method capable of collecting a metal halide in the gaseous form at a temperature as low as 450° C. or less is found for the first time.

The related art includes a description that a hydrogen halide reacts with a metal, thereby forming a metal halide, but reaction of a single metal substance, which is not in the form of a compound, with a hydrogen halide does not proceed efficiently. This is presumed because when a metal and a halide are reacted each other, a portion of the mixture is converted into a metal halide but a large portion remains as an organic metal halide in the resin component. Reaction of aluminum powder with a styrene resin composition having a bromine concentration of 16 wt. % at 350° C., the bromine removing ratio is only about 30%. This suggests that co-existence of a metal compound and a halide in a resin enables effective formation of a metal halide.

Thus, the advantage of the present invention depends on the reaction temperature of a metal compound and a hydrocarbon compound; and the boiling point or sublimation point of the metal halide thus generated under normal pressure. This reaction temperature is 450° C. or less, preferably 400° C. or less, more preferably 300° C. or less. The metal halide thus generated has a boiling point or sublimation point of 400° C. or less, preferably 350° C. or less, more preferably 300° C. or less under normal pressure. At a reaction temperature exceeding 450° C., formation of the metal halide does not occur until the temperature becomes extremely high. A boiling point or sublimation point of the metal halide exceeding 400° C. under normal pressure is not preferred, because not only dehalogenation effects lower but also metal components cannot be collected in the gaseous form under reduced pressure and the metal halide remains in the treated resin. For example, diantimony trioxide (reducing temperature in polystyrene is 280 to 300° C.) generates antimony tribromide at 280 to 300° C., reacting with a brominated compound in the presence of a thermoplastic resin and this antimony tribromide starts evaporation. The temperature condition at this time is 280 to 450° C., preferably 290 to 380° C., more preferably 295 to 320° C. At a temperature less than 280° C., the reaction does not proceed, while at a temperature greater than 450° C., the decomposition of the resin itself proceeds as well as the reaction between the halogen and the metal compound, thereby reducing the collection amount of the resin. Temperatures outside the range are therefore not preferred.

It is preferred to add a treating agent having a hydrogenating capacity in order to accelerate formation of a metal halide and heighten dehalogenation effect. Although no particular limitation is imposed on the treating agent, that having a carbon/hydrogen element number ratio falls within a range of 0.25 to 1.0, preferably 0.255 to 0.8, more preferably 0.3 to 0.7 is suited. The carbon/hydrogen element number ratios exceeding 1.0 are not preferred because not hydrogenation of a halogen but carbonization of the treating agent occurs at such a ratio.

As the treating agent having a hydrogenating capacity of a halogen, polyolefin resins, particularly, polypropylenes having a tertiary hydrogen are preferred.

A ratio of the treating agent having a hydrogenating capacity of a halogen/the resin is preferably 0.7 or less in terms of weight ratio. Weight ratios exceeding 0.7 are not preferred, because the metal component is reduced even to a metal by the reducing power of the treating agent, making it impossible to collect this component in the gaseous form.

In the invention, the expression "specific energy applied to the resin composition until the temperature of the resin composition reaches 300° C." means an energy per unit volume caused by shearing that is applied to the resin composition to be treated and the treating agent during from the time when they are charged from a raw material inlet of a pre-heating and kneading extruder until the kneaded molten substance becomes 300° C.

For efficient reaction of the halogen-containing thermoplastic resin and the metal compound, or of the thermoplastic resin composition containing a halide, the metal compound and the hydrogenating agent, they must be preliminary kneaded sufficiently and uniformly by heating before reaction. The specific energy which indicates the kneading degree of these compounds is 10 MJ/m$^3$ to 300 MJ/m$^3$, preferably 20 MJ/m$^3$ to 200 MJ/m$^3$, more preferably 50 MJ/m$^3$ to 150 MJ/m$^3$. When the specific energy is less than 10 MJ/m$^3$, the kneading of the resin, treating agent and metal compound is not sufficient. When it exceeds 300 MJ/m$^3$, on the other hand, generation of heat by shearing becomes marked, causing reaction of the treating agent, resin and metal compound prior to uniform kneading. Specific energy outside the above-described range is therefore not preferred.

Upon kneading of a resin with a treating agent, some viscosity is necessary. The viscosity upon kneading depends on temperature. Resin temperature of 300° C. or greater is not preferred, because viscosity lowers at such a temperature, which disturbs sufficient kneading of the treating agent, resin and metal compound. For effective reaction of this reaction system, the specific energy before the resin temperature reaches 300° C. therefore becomes an important factor. After preliminary kneading of the treating agent, resin and metal compound in an extruder, the barrel of the extruder was opened once to measure the resin temperature by a thermocouple thermometer. A molten portion of 300° C. or less was taken out and quenched in liquid nitrogen. After cutting by a microtome, its dispersing degree was observed by a transmission type electron microscopy. The term "uniform dispersion" as used herein means the dispersion state of the resin component and the treating agent in the form of particles of 100 μm or less.

The molten resin thus uniformly mixed is fed to an apparatus equipped with a rotary stirring function and in this apparatus, reaction and deaeration are conducted. In this apparatus, the reaction proceeds rapidly and the metal halide and hydrogen halide appear. It is preferred to remove both of them immediately. The effective processing surface area, an index of this efficiency, is 5 to 1000 m$^2$, preferably 20 to 500 m$^2$, more preferably 100 to 300 m$^2$. At an effective processing surface area less than 5 m$^2$, the resulting metal halide cannot be removed rapidly. When it exceeds 1000 m$^2$, on the other hand, this removing step becomes unstable. Effective processing surface areas outside the above-described range are therefore not preferred.

Figure 2:
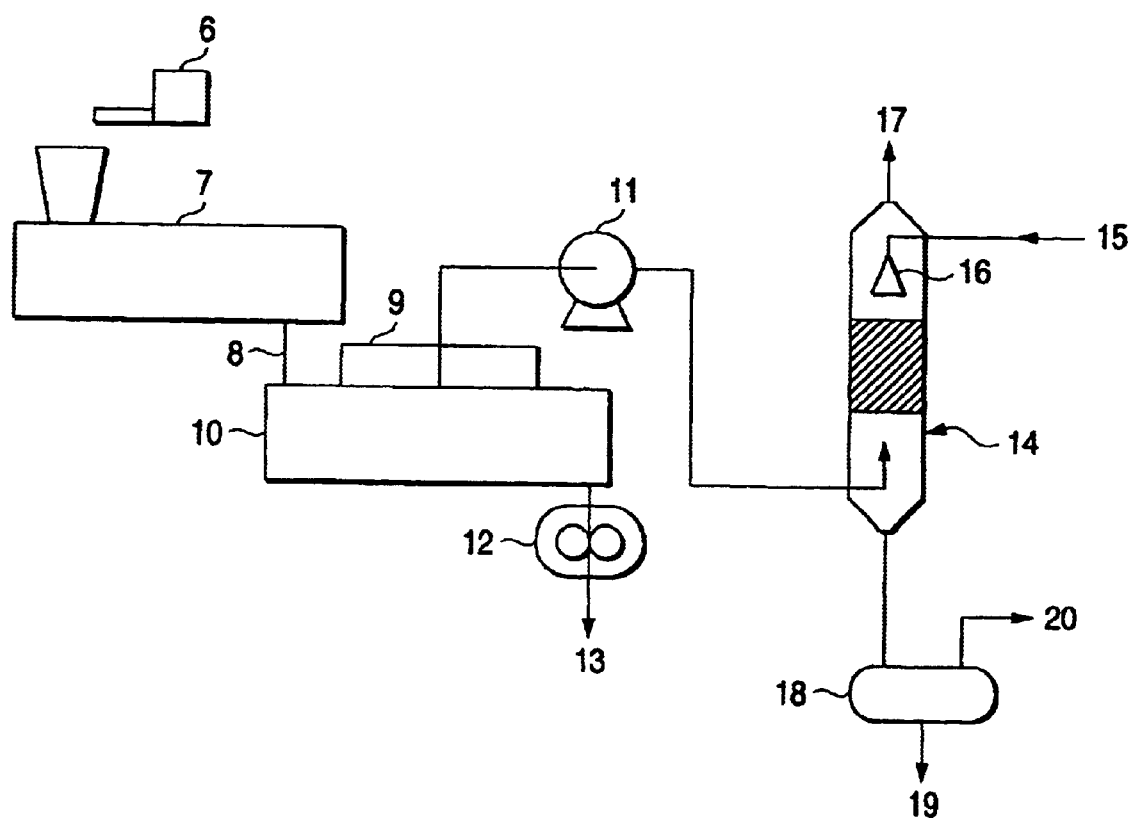
FIG. 2 is a process employed for the investigation of the invention. The numerals in these drawings represent as follows.

The term "pressure reducing degree" as used in the present invention means the pressure inside of the kneader 10 shown in FIG. 2.

Pressure reduction of this removal system enables effective removal of a halogen and a metal halide. The pressure reducing degree is 13.3 kPa or less, preferably 6.7 kPa or less, more preferably 1.3 kPa or less. The pressure reducing degrees exceeding 13.3 kPa deteriorate deaeration efficiency, thereby disturbing removal of the halogen and metal compound in a short time. Efficiency of collection in the gaseous form can be improved not only by this pressure reduction but also by introduction of an inert gas such as nitrogen or argon into the removal system.

The resin thus treated takes the form of a wax. Since it hardly contains a halogen or metal compound, it may be used as a solid fuel after cooling and solidification or a raw material to be liquefied.

The term "aqueous alkali solution" as used in the present invention means an aqueous solution of sodium hydroxide, potassium hydroxide or the like. The collected gas is caused to pass through the aqueous alkali solution or is washed therewith by spraying it to the gas, thereby causing hydrolysis of the metal halide. For example, antimony tribromide becomes diantimony trioxide and owing to a large specific gravity, it is precipitated readily. Bromine at this time exists as sodium bromide in the aqueous solution. After removal of the precipitate, the residue is evaporated to dryness, whereby crystals can be collected. In the process of the invention, halogen and metal are collected in the gaseous form so that metal and halogen thus collected have a purity high enough to be reused as is, as an industrial material.

The term "metal oxide" as used in the present invention means a metal oxide obtained by hydrolysis of the resulting metal halide, followed by drying. Examples thereof include diantimony trioxide, diantimony pentaoxide, zinc oxide and bismuth oxide.

The expression "a mixture comprising the thermoplastic resin and the treating agent having a capacity of hydrogenating a halogen, which mixture has been separated and collected" as used in the present invention means a mixture of a dehalogenated resin component and a treating agent component.

The present invention will be illustrated in greater detail with reference to the following Examples, but the invention should not be construed as being limited thereto.

(1) Analysis of Halogen and Metal:

A halogen content is analyzed by burning a resin composition in a combustion flask under pure oxygen, allowing the resulting gas to absorb in water preliminary charged in the flask, adjusting pH with a mixture (buffer) of acetic acid and sodium acetate and then measuring by a bromine ion meter ("IN55S", manufactured by Towa Denpa K.K.). A metal (antimony) content is measured by plasma ion analysis (ICP analysis) or atomic absorption analysis.

(2) Halide-containing Resin Composition, Treating Agent and Metal Compound:

A model resin composition was prepared by preliminary kneading, in an extruder, a commercially available HIPS ("A&M Polystyrene H8117", trade name)/decabromodiphenyl ether (product of Tosoh Corporation)/diantimony trioxide (product of Yamanaka Chemical Co., Ltd.) or zinc oxide (product of Wako Pure Chemical Industries, Ltd.) at a wieght ratio of 80.250/5. As a treating agent, a mineral oil ("MORESCO White P500", product of Matsumura Oil Research Corp, boiling point: 450° C. or greater) and polypropylene ("J-airomer PM600A", product of Japan Polyolefins Co., Ltd., melt index: 20 g/10 min) were employed.

(3) Measurement of Viscosity:

After measurement by a capillary viscometer and Bagley correction, the viscosity was determined.

(4) Process for Effecting the Invention

For kneading of the model resin composition and a hydrogenating agent well before their reaction, a preliminary kneading extruder is disposed upstream of the kneader. The pressure of the head of the preliminary kneading extruder is maintained at 12 MPa. The hydrogenating agent and model resin composition, after kneading, are fed through an orifice tube to a kneader, wherein the kneaded mass is subjected to deaeration at a breath. The pre-heating and kneading extruder has an L/D of 10.25 and screw diameter is 24.5 mm. The clearance between the screw and the barrel of the pre-heating and kneading extruder is set at 0.5 mm and the rotational number of the screw is 50 to 200 rpm. The resin temperature at the outlet of the pre-heating and kneading extruder was 280 to 310° C. A completely uniform kneaded mass of the model resin composition and hydrogenating agent are fed to a kneader. The pressure inside of the kneader was 1.3 kPa to 13 kPa. The treating time here was set so that the treated substance would be withdrawn within 5 minutes. The resulting gas is suctioned by a corrosion-resistant ceramic vacuum pump and introduced into a washing tower through an exhaust gas line. An aqueous solution of sodium hydroxide is sprayed from the upper part of the washing tower to cause reaction with the gas and antimony tribromide or zinc bromide and hydrogen bromide are removed. At this time, the washing liquid to collect the gas was adjusted to pH 7 to 12. The washing liquid used for gas collection is fed, in the form of white suspension, to a continuous filtering apparatus, wherein it is separated into diantimony trioxide or zinc oxide and an aqueous solution of sodium bromide. The diantimony trioxide or zinc oxide is evaporated to dryness. The purity of antimony was 99.8%. Water was evaporated from the aqueous solution obtained by separation, whereby NaBr having a purity of 99% was obtained.

EXAMPLES 1 AND 2 & COMPARATIVE EXAMPLES 1 TO 3

The resin compositions obtained in Examples 1 and 2, and Comparative Example 3 are to compare between the cases where a metal compound was added or not to a mixture of HIPS with decabromodiphenyl ether. The resin compositions obtained in Example 1 and Comparative Examples 1 and 2 are for comparison in terms of the effect given by whether or not a collection system (kneader) was subjected to pressure reduction. The reaction was conducted under conditions of an effective processing surface area of 300 m$^2$ and a specific energy of 150 MJ/m$^3$.

EXAMPLES 3 TO 5 & COMPARATIVE EXAMPLE 4

Examples 3 to 5 and Comparative Example 4 are to show the effect of the addition of a hydrogenating agent. In Example 3, 30 wt. % of a mineral oil having a high boiling point (450° C. or greater) was mixed with 70 wt. % of the model resin composition. Since the mineral oil was in the liquid form, it was subjected to, as preliminary mixing, a separate addition treating operation in a twin screw kneader, ZSK (25 mm in diameter) manufactured by Werner & Pfleiderer/Germany, whereby the resin composition was prepared. The resulting resin composition was then charged in a pre-heating and kneading extruder. The specific energy at this time was adjusted so that the total of a history upon kneading in ZSK and that in a preheating and kneading extruder would be sufficient for Example 3. Comparative Example 4 is the case wherein 90 wt. % of PP and 10 wt. % of the model resin composition were added and mixed. The reaction was effected under conditions of an effective processing surface area of 300 m and a specific energy of 150 MJ/m$^3$.

EXAMPLES 6 TO 10 AND COMPARATIVE EXAMPLE 5

Examples 6 to 10 and Comparative Example 5 are to compare the effects given by the difference in the effective processing surface area or specific energy.

The results of Examples and Comparative Examples are shown in Tables 1 to 3.

TABLE 1

|  | Ex. 1 | Ex. 2 | Comp. Ex. 1 | Comp. Ex. 2 | Comp. Ex. 3 |
|---|---|---|---|---|---|
| Bromine content before treatment wt. % | 16 | 16 | 16 | 16 | 16 |
| Metal compound and its amount wt. % | $Sb_2O_3$ 4.3 | ZnO 1.5 | $Sb_2O_3$ 4.3 | $Sb_2O_3$ 4.3 | — |
| Remaining amount of resin components after treatment wt. % | 88.7 | 72.2 | 92 | 90 | 87 |
| Bromine removing ratio % | 96 | 98 | 77.5 | 78.1 | 62 |
| Metal content after treatment | 78 ppm | 100 ppm | 4.7 wt. % | 1.7 wt. % | — |
| Pressure reducing degree kPa | 1.6 | 3 | 101 | 101 | 1.6 |
| Reaction temperature ° C. | 299 | 402 | 305 | 400 | 297 |

TABLE 2

|  | Ex. 3 | Ex. 4 | Ex. 5 | Comp. Ex. 4 |
|---|---|---|---|---|
| Bromine content before treatment wt. % | 11.2 | 8 | 8 | 1.6 |
| Metal compound and its amount wt % | $Sb_2O_3$ 3.01 | $Sb_2O_3$ 2.3 | $Sb_2O_3$ 2.3 | $Sb_2O_3$ 0.41 |
| Remaining amount of resin components after treatment wt. % | 83 | 89 | 82 | 92 |
| Bromine removing ratio % | 99 | 99< | 99< | 99< |
| Metal content after treatment | nd | nd | nd | 0.45 wt. % |
| Pressure reducing degree kPa | 2.7 | 1.3 | 3.8 | 2.8 |
| Reaction temperature ° C. | 295 | 295 | 398 | 297 |

Note)
nd: means "not detected".

TABLE 3

| Item | Unit | Ex. 6 | Ex. 7 | Ex. 8 | Ex. 9 | Ex. 10 | Comp. Ex. 5 |
|---|---|---|---|---|---|---|---|
| Resin recovery ratio | wt. % | 85 | 80 | 82 | 81 | 83 | 80 |
| Effective processing surface area | m$^2$ | 780 | 400 | 100 | 30 | 10 | 2 |
| Specific energy | MJ/m$^3$ | 300 | 182 | 63 | 50 | 15 | 9.5 |
| Br content in resin before treatment | wt. % | 8.6 | 8.6 | 8.6 | 8.6 | 8.6 | 8.6 |
| Sb content in resin before treatment | wt. % | 4 | 4 | 4 | 4 | 4 | 4 |
| Bromine removing ratio | % | 99< | 99< | 99< | 99 | 97 | 55 |
| Sb content in treated resin | wt. % | nd | nd | nd | nd | nd | nd |
| Purity of $Sb_2O_3$ obtained by hydrolysis | wt. % | 99< | 99< | 99< | 99 | 95 | 80 |
| Retention time in kneader | min sec | 3'50" | 4'20" | 4'00" | 4'08" | 3'50" | 4'05" |
| Temperature of styrene resin composition | ° C. | 300 | 308 | 300 | 308 | 295 | 310 |

Note)
nd: means "not detected"

INDUSTRIAL APPLICABILITY

The present invention provides a method for treating the waste without gasification or liquefaction of a resin by combustion or thermal decomposition, thereby removing and collecting the halogen such as bromine and the metal oxide therefrom in a high yield in a short time; recovering the thus-treated resin as a solid fuel in a high yield; and providing it for recycling use.

What is claimed is:

1. A treating method of a resin composition comprising:
   kneading a resin composition comprising a thermoplastic resin, 0 to 0.7 part by weight, based on 1 part by weight of the thermoplastic resin, of a treating agent having a capacity of hydrogenating a halogen and a halide, at 280 to 450° C., in the presence of a metal compound selected from the group consisting of Sb or Zn, which combines with a halogen atom to generate a metal halide compound having a boiling point or sublimation point not greater than 450° C. at atmospheric pressure, to thereby convert the halide into a metal halide; and
   separating and collecting, from the resin composition, each of a mixture of the thermoplastic resin and the treating agent having a capacity of hydrogenating a halogen, and the metal halide.

2. The method according to claim 1, wherein the treating agent having a capacity of hydrogenating a halogen is an organic compound or polymer having a carbon/hydrogen element number ratio of 0.25 to 1.0.

3. The method according to claim 2, wherein the treating agent having a capacity of hydrogenating a halogen is a polyolefin.

4. The method according to claim 1, wherein reaction and deaeration are conducted by using an apparatus having a rotary stirring function under the conditions of an effective processing surface area of 5 m² to 1000 m² and pressure reducing degree of 13.3 kPa or less.

5. The method according to claim 4, wherein a specific energy applied to the resin composition until the temperature of the resin composition reaches 300° C. is 10 MJ/m³ to 300 MJ/m³.

6. The method according to claim 1, further comprising a step of treating the thus-separated and collected metal halide with an aqueous alkali solution, to thereby convert the metal of the metal halide into a metal oxide.

7. A mixture obtained by separating and collecting according to a method of any one of claims 1 to 6, comprising the thermoplastic resin and the treating agent having a capacity of hydrogenating a halogen.

\* \* \* \* \*